US008199047B2

(12) United States Patent
Fretenburg et al.

(10) Patent No.: US 8,199,047 B2
(45) Date of Patent: Jun. 12, 2012

(54) HIGH-PRECISION RADIO FREQUENCY RANGING SYSTEM

(75) Inventors: Russell Alan Fretenburg, North Vancouver (CA); Henry Hon-You Leung, Coquitlam (CA); Derek John Pyner, Delta (CA); Bradley David Farnsworth, Alexandria, VA (US); David W. A. Taylor, Jr., Greensboro, NC (US)

(73) Assignee: Ensco, Inc., Falls Church, VA (US)

( * ) Notice: Subject to any disclaimer, the term of this patent is extended or adjusted under 35 U.S.C. 154(b) by 0 days.

(21) Appl. No.: 12/659,448

(22) Filed: Mar. 9, 2010

(65) Prior Publication Data

US 2011/0221632 A1 Sep. 15, 2011

(51) Int. Cl.
*G01S 13/08* (2006.01)
(52) U.S. Cl. ...................... 342/145; 342/118
(58) Field of Classification Search ............ 342/118, 342/145
See application file for complete search history.

(56) References Cited

U.S. PATENT DOCUMENTS

| | | | |
|---|---|---|---|
| 4,804,961 A * | 2/1989 | Hane | 342/125 |
| 6,067,039 A | 5/2000 | Pyner et al. | |
| 6,452,980 B1 * | 9/2002 | Zalud et al. | 375/285 |
| 6,453,168 B1 | 9/2002 | McCrady et al. | |
| 6,665,333 B2 | 12/2003 | McCrady et al. | |
| 6,744,398 B1 | 6/2004 | Pyner et al. | |
| 7,453,961 B1 | 11/2008 | Li et al. | |
| 2001/0053699 A1 | 12/2001 | McCrady et al. | |
| 2002/0118723 A1 | 8/2002 | McCrady et al. | |
| 2006/0274818 A1 | 12/2006 | Gilmour et al. | |
| 2007/0192391 A1 | 8/2007 | McEwan | |
| 2008/0129591 A1 * | 6/2008 | Lamance et al. | 342/357.12 |
| 2010/0271263 A1 * | 10/2010 | Moshfeghi | 342/378 |

OTHER PUBLICATIONS

Larry J. Williams, Ph.D., "Small Unit Operations Situation Awareness System (SUO SAS): An Overview" Military Communications Conference, 2003, pp. 174-178, vol. 1, IEEE.
Worcester Polytechnic Institute, Slides from 2006 Workshop on Precision Indoor Tracking and Positioning, Radio Frequency Panel Presentation, Sergey Makaroff, moderator, presented on Aug. 8, 2006.
Dennis McCrady, et al., RF Ranging for Indoor Tracking and Positioning—WPI Technology Workshop: Precision Indoor Personnel Location and Tracking for Emergency Responders, Slides from 2006 Workshop on Precision Indoor Tracking and Positioning, presented on Aug. 7, 2006.
Bradley D. Farnsworth & David W.A. Taylor, High Precision Narrow-Band RF Ranging, Institute of Navigation Proceeding of the 2010 International Technical Meeting of the Institute of Navigation, Jan. 25-27, 2010, pp. 161-166 (retrieved from the internet at http://www.ion.org/search/view_abstract.cfm?jp=p&idno=8793).
David W.A. Taylor & Peter N. Johnson, Innovative approach to local area precise positioning using direct sequence spread spectrum, Institute of Navigation Proceedings of the 2003 Navigation Technical Meeting of the Institute of Navigation, Jan. 22-24, 2003, pp. 623-639 (retrieved from the internet at http://www.ion.org/search/purchase_paper.cfm?jp=p&id=3805).

* cited by examiner

*Primary Examiner* — Timothy A Brainard
(74) *Attorney, Agent, or Firm* — Finnegan Henderson Farabow Garrett & Dunner, LLP

(57) ABSTRACT

Methods for estimating a distance between an originator and a transponder, methods for calculating a fine time adjustment in a radio, computer-readable storage media containing instructions to configure a processor to perform such methods, originators used in a system for estimating a distance to a transponder, and transponders used in a system for estimating a distance to an originator. The methods utilize fine time adjustments to achieve sub-clock cycle time resolution. The methods may utilize offset master clocks. The methods may utilize a round-trip full-duplex configuration or a round-trip half-duplex configuration. The method produces accurate estimates of the distance between two radios.

27 Claims, 7 Drawing Sheets

HIGH-PRECISION RADIO FREQUENCY RANGING SYSTEM

BACKGROUND

1. Technical Field

This invention relates to radio frequency ranging systems that provide an estimate of the distance between two radios and/or the relative or absolute position of a radio.

2. Description of Related Art

Radio-frequency (RF) ranging technology provides distance and relative position between objects without the need to take physical measurements. RF ranging systems calculate the distance between two objects based in part on the time a radio signal propagates between those objects. In air, radio signals propagate at a constant rate, roughly equal to the speed of light.

Knowing the absolute position of a sufficient number of objects (such as e.g., cell phone towers fixed relative to the earth), an RF ranging system can be used to determine the absolute position of other objects. An RF ranging system may utilize a signal from the Global Positioning System (GPS) to provide absolute location. In many situations, however, GPS signals are either unavailable or actively denied to a potential user. RF ranging systems can provide accurate information regarding distance and/or location even in locations or situations without access to GPS signals.

Two general types of RF time-of-flight ranging systems exist. The first type utilizes highly accurate, synchronized clocks to calculate the propagation time. For example, in such a system, a first radio and a second radio both contain clocks synchronized such that the second radio receives the signal from the first radio and compares the departure time to the arrival time. The system multiplies this propagation time by the speed of light to estimate the distance between the radios. Maintaining a system of clocks synchronized to the level of accuracy required to make this type of system practicable for ranging purposes represents a significant drawback.

The second type of RF time-of-flight ranging system does not require absolute clock synchronization. Typically, these systems compute clock offsets or correction factors to account for clock references that are not synchronized. The clock offset can be computed as an unknown along with the coordinates of a positioning system, such as GPS, based on a plurality of observations. For time-of-flight measurements between two radios, or where the above method otherwise fails, the clock offset may be observed and computed by monitoring the phasing of the received signal, relative to the local clock.

RF ranging systems may utilize a round-trip time-of-flight measurement to compute the distance between the radios. These types of systems can be further classified into "round-trip full-duplex" configurations and "round-trip half-duplex" configurations. In a round-trip full-duplex configuration, a first radio transmits a signal to a second radio, which then retransmits the same signal back to the first radio without performing any calculations using the signal. After receiving the retransmitted signal from the second radio, the first radio compares the departure time to the arrival time to calculate the round-trip signal propagation time. The system multiplies this time by the speed of light and divides by two to estimate the distance between the radios.

In a round-trip half-duplex configuration, a first radio transmits a signal to a second radio, which then performs calculations using that signal. The second radio then transmits a new signal, which often contains the results of the calculations performed by the second radio, back to the first radio. The first radio then utilizes the data from the second radio and other data within the first radio to calculate the round-trip signal propagation time. The system multiplies this time by the speed of light and divides by two to estimate the distance between the radios.

Early approaches to RF ranging systems were primarily dominated by continuous wave (CW) and other narrow bandwidth systems. While CW systems, such as tellurometers, enable long distance ranging in the tens of kilometers and accuracies of 1 cm at a distance of 1 km in low multipath environments, these systems often suffer from poor multipath performance, susceptibility to jamming, have a high probability of detection and interception, and tend to cause interference to other communications systems. In recent years, CW techniques have mostly been superseded by ultra-wideband (UWB) and various spread spectrum systems.

The most common approaches to improve RF time-of-flight ranging performance are to increase system power (signal-to-noise ratio) and to increase system bandwidth. Scaling bandwidth up to multi-GHz levels, or equivalently scaling to very short pulses in time can achieve centimeter-level position accuracies and resolution. When UWB systems are constrained to operate within FCC regulations however, their range is typically limited to a few hundred meters using directional antennas in low multipath environments, and typically much less than 100 meters indoors with omni-directional antennas. UWB systems also require complex RF electronics which can drive up system cost and risk.

Spread spectrum technologies have several advantages over UWB systems that include low probability of intercept, low susceptibility to jamming, and increased range over UWB systems when radios are required to conform to FCC regulations. Many commercial spread spectrum systems operate as FCC unlicensed radios in the industrial, scientific, and medical (ISM) bands of 915 MHz, 2.4 GHz, and/or 5.8 GHz. Some commercially available implementations, such as Zigbee radios, include RF ranging with accuracies of several meters and rely on time difference of arrival and received signal strength measurements. Cellular phone networks also estimate radio locations through angle of arrival and received signal strength measurements with accuracies in the tens of meters. In addition, in dense signal environments, certain infrastructure radio signals such as television, radio, and Wi-Fi hotspots can be used to estimate location within several meters, depending on the availability of signals.

Accurate RF ranging systems can be implemented using a common modulation technique known as direct-sequence spread spectrum (DSSS), in which the input data (often called the baseband signal) is multiplied by a predetermined repeating sequence of "1" and "−1" values (referred to as a pseudonoise or PN code sequence). Each value in a PN code sequence is referred to as a chip. The PN code sequence is at a higher frequency than the baseband signal and thereby "spreads" the baseband signal to a wider band or "spectrum." The resulting PN-coded signal is modulated to an RF carrier frequency and transmitted to a receiver. In the receiver, a correlator multiplies the PN-coded signal by the same PN code sequence (since $1 \times 1 = 1$ and $-1 \times -1 = 1$) to reconstruct the original baseband signal.

RF ranging systems using asynchronous clocks can use PN codes to measure small phase offsets between radios. Specifically, the autocorrelation function of a PN code sequence displays a sharp peak when the PN code sequences are aligned. The peak moves with the phase offset between the two PN code sequences. By accurately determining the phase offset, i.e, relative timing, between a transmitter and receiver, an RF ranging system can improve its ability to estimate distance.

The theoretical ranging accuracy limit for the variance for an RF time-of-flight ranging system using DSSS is given by the Cramer-Rao Lower Bound, $$\sigma_t^2 = \frac{1}{8\pi^2 \cdot SNR \cdot \alpha \cdot N \cdot BW^2}$$

where SNR is the average signal-to-noise ratio of the two radios, $\alpha$ is the number of code copies averaged, BW is the occupied spectral bandwidth, N is the number of chips in each PN code sequence, and $\sigma_t^2$ is the lower bound of the variance of the round-trip time of flight. The lower bound of the standard deviation of the one-way distance, $\sigma_d$ is given by the equation $$\sigma_d = \sigma_t \cdot \frac{c}{2} \cdot k_{medium}$$

where c is the speed of light and $k_{Medium}$ is a correction factor for the speed of light through the intervening medium between the originator and transponder.

There is a need for a high-precision RF ranging system that obviates or at least mitigates one or more of the shortcomings of previous techniques to provide more accurate estimates of distance between two radios. Through the use of techniques discussed below, the present invention can provide an RF ranging system using DSSS that approaches the theoretical ranging accuracy limit.

SUMMARY

The present disclosure discusses methods for estimating a distance between a first radio (an originator) and a second radio (a transponder), methods for calculating a fine time adjustment in a radio, computer-readable storage media containing instructions to configure a processor to perform such methods, originators used in a system for estimating a distance to a transponder, and transponders used in a system for estimating a distance to an originator.

In one aspect, a method for estimating a distance between an originator and a transponder includes: transmitting a first message from a first channel in the originator; receiving a second message on a second channel in the originator; calculating a coarse time measurement of the round-trip propagation time between the originator and the transponder; calculating a fine time adjustment in the originator by calculating a plurality of peak error measurements of a correlator output in the second channel of the originator during a time period, calculating a rate of change of the plurality of peak error measurements during the time period, and estimating a peak error at a point after the time period by using the rate of change of the plurality of peak error measurements during the time period; calculating a round-trip propagation time using the coarse time measurement and the fine time adjustment; and calculating an estimated distance between the originator and the transponder using the round-trip propagation time.

In another aspect, a method for estimating a distance between an originator and a transponder includes: transmitting a first message from the originator to the transponder; transmitting a second message from the transponder to the originator; calculating a coarse time measurement of the round-trip propagation time between the originator and the transponder; calculating a first fine time adjustment in the transponder by calculating a first plurality of peak error measurements of a correlator output in the transponder during a first time period, calculating a rate of change of the first plurality of peak error measurements during the first time period, and estimating a peak error at a point after the first time period by using the rate of change of the first plurality of peak error measurements during the first time period; calculating a second fine time adjustment in the originator by calculating a second plurality of peak error measurements of a correlator output in the originator during a second time period, calculating a rate of change of the second plurality of peak error measurements during the second time period, and estimating a peak error at a point after the second time period by using the rate of change of the second plurality of peak error measurements during the second time period; calculating a round-trip propagation time using the coarse time measurement and the first and second fine time adjustments; and calculating an estimated distance between the originator and the transponder using the round-trip propagation time.

In another aspect, a method for calculating a fine time adjustment in a radio includes: calculating a plurality of peak error measurements of a correlator output in the radio during a time period; calculating a rate of change of the plurality of peak error measurements during the time period; and estimating a peak error at a point after the time period by using the rate of change of the plurality of peak error measurements during the time period.

In another aspect, a computer-readable storage medium contains instructions to configure a processor to perform a method for estimating a distance between an originator and a transponder in which the method includes: transmitting a first message from a first channel in the originator; receiving a second message on a second channel in the originator; calculating a coarse time measurement of the round-trip propagation time between the originator and the transponder; calculating a fine time adjustment in the originator by calculating a plurality of peak error measurements of a correlator output in the second channel of the originator during a time period, calculating a rate of change of the plurality of peak error measurements during the time period, and estimating a peak error at a point after the first time period by using the rate of change of the plurality of peak error measurements during the time period; calculating a round-trip propagation time using the coarse time measurement and the fine time adjustment; and calculating an estimated distance between the originator and the transponder using the round-trip propagation time.

In another aspect, a computer-readable storage medium contains instructions to configure a processor to perform method for estimating a distance between an originator and a transponder in which the method includes: transmitting a first message from the originator to the transponder; transmitting a second message from the transponder to the originator; calculating a coarse time measurement of the round-trip propagation time between the originator and the transponder; calculating a first fine time adjustment in the transponder by calculating a first plurality of peak error measurements of a correlator output in the transponder during a first time period, calculating a rate of change of the first plurality of peak error measurements during the first time period, and estimating a peak error at a point after the first time period by using the rate of change of the first plurality of peak error measurements during the first time period; calculating a second fine time adjustment in the originator by calculating a second plurality of peak error measurements of a correlator output in the originator during a second time period, calculating a rate of change of the second plurality of peak error measurements during the second time period, and estimating a peak error at a point after the second time period by using the rate of change of the second plurality of peak error measurements during the second time period; calculating a round-trip propagation time using the coarse time measurement and the first and second fine time adjustments; and calculating an estimated distance between the originator and the transponder using the round-trip propagation time.

In another aspect, a computer-readable storage medium contains instructions to configure a processor to perform a method for calculating a fine time adjustment in a radio in which the method includes calculating a plurality of peak error measurements of a correlator output in the radio during a time period; calculating a rate of change of the plurality of peak error measurements during the time period; and estimating a peak error at a point after the time period by using the rate of change of the plurality of peak error measurements during the time period.

In another aspect, an originator for estimating a distance between the originator and a transponder includes: transmission means for transmitting a first message from a first channel in the originator; receiving means for receiving a second message on a second channel in the originator; calculating means for calculating a coarse time measurement of the round-trip propagation time between the originator and the transponder; calculating means for calculating a fine time adjustment including calculating means for calculating a plurality of peak error measurements of a correlator output in the second channel during a time period, calculating means for calculating a rate of change of the plurality of peak error measurements during the time period, and estimating means for estimating a peak error at a point after the time period by using the rate of change of the plurality of peak error measurements during the time period; calculating means for calculating a round-trip propagation time using the coarse time measurement and the fine time adjustment; and calculating means for calculating an estimated distance between the originator and the transponder using the round-trip propagation time.

In another aspect, an originator for estimating a distance between the originator and a transponder includes: transmission means for transmitting a first message to the transponder; receiving means for receiving a second message from the transponder; calculating means for calculating a coarse time measurement of the round-trip propagation time between the originator and the transponder; calculating means for calculating a fine time adjustment in the originator including calculating means for calculating a plurality of peak error measurements of a correlator output in the originator during a time period, calculating means for calculating a rate of change of the plurality of peak error measurements during the time period, and estimating means for estimating a peak error at a point after the time period by using the rate of change of the plurality of peak error measurements during the time period; calculating means for calculating a round-trip propagation time using the coarse time measurement, the fine time adjustment, and at least some data from the second message from the transponder; and calculating means for calculating an estimated distance between the originator and the transponder using the round-trip propagation time.

In another aspect, a transponder for use in a system for estimating a distance between an originator and the transponder includes: receiving means for receiving a first message from the originator; calculating means for calculating a coarse time measurement of the round-trip propagation time between the originator and the transponder; calculating means for calculating a fine time adjustment in the transponder including calculating means for calculating a plurality of peak error measurements of a correlator output in the transponder during a time period, calculating means for calculating a rate of change of the plurality of peak error measurements during the time period; and estimating means for estimating a peak error at a point after the time period by using the rate of change of the plurality of peak error measurements during the time period; and transmission means for transmitting a second message to the originator.

The accompanying drawings which are incorporated in and constitute a part of this specification, illustrate embodiments of the disclosed method and, together with the description, serve to explain the principles of the methods and computer-readable storage media.

It is to be understood that both the foregoing general description and the following detailed description are exemplary and explanatory only and are not restrictive of the scope of the invention as claimed.

DESCRIPTION OF THE DISCLOSED EMBODIMENTS

Using the methods and apparatus described below, an RF round-trip time-of-flight asynchronous direct-sequence spread spectrum (DSSS) system can be designed to operate as an FCC unlicensed radio in the ISM bands. However, such a system is flexible in spectrum usage, and not tied to any particular band. Such a system would allow unlicensed operation, relatively long range, and relatively precise measurements.

Figure 1:
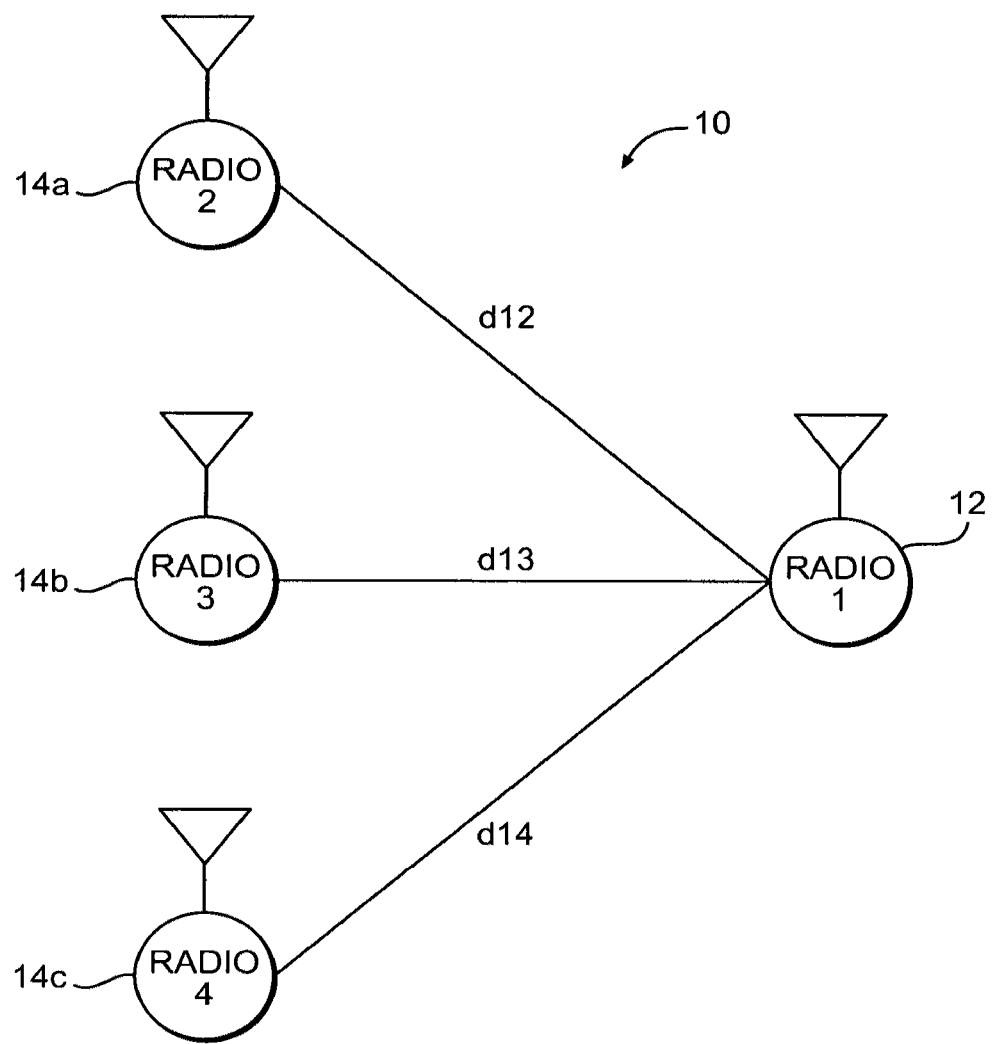
FIG. 1 is an illustration of an exemplary RF ranging system employing the methods of the present disclosure.

Depicted in FIG. 1 is an exemplary RF ranging system, designated generally by 10. System 10 includes a mobile radio 12 and at least one other radio, designated generally by 14, which may be fixed (e.g., a stationary radio or cell phone tower) or mobile. RF ranging system 10 may be used to calculate the distance between mobile radio 12 and any one of the other radios, for example radio 14a, and/or may be used to find the location of mobile radio 12 relative to a plurality of other radios, for example, radios 14a, 14b, and 14c, which may be organized into a network.

Such a system has many uses, including but not limited to: location and tracking of indoor pedestrians such as first responders, location and tracking of a military vehicle or soldier, location and control of aerial vehicles (manned or unmanned), and assessment of military weapons guidance systems.

Round-Trip Full-Duplex Configuration

Figure 2:
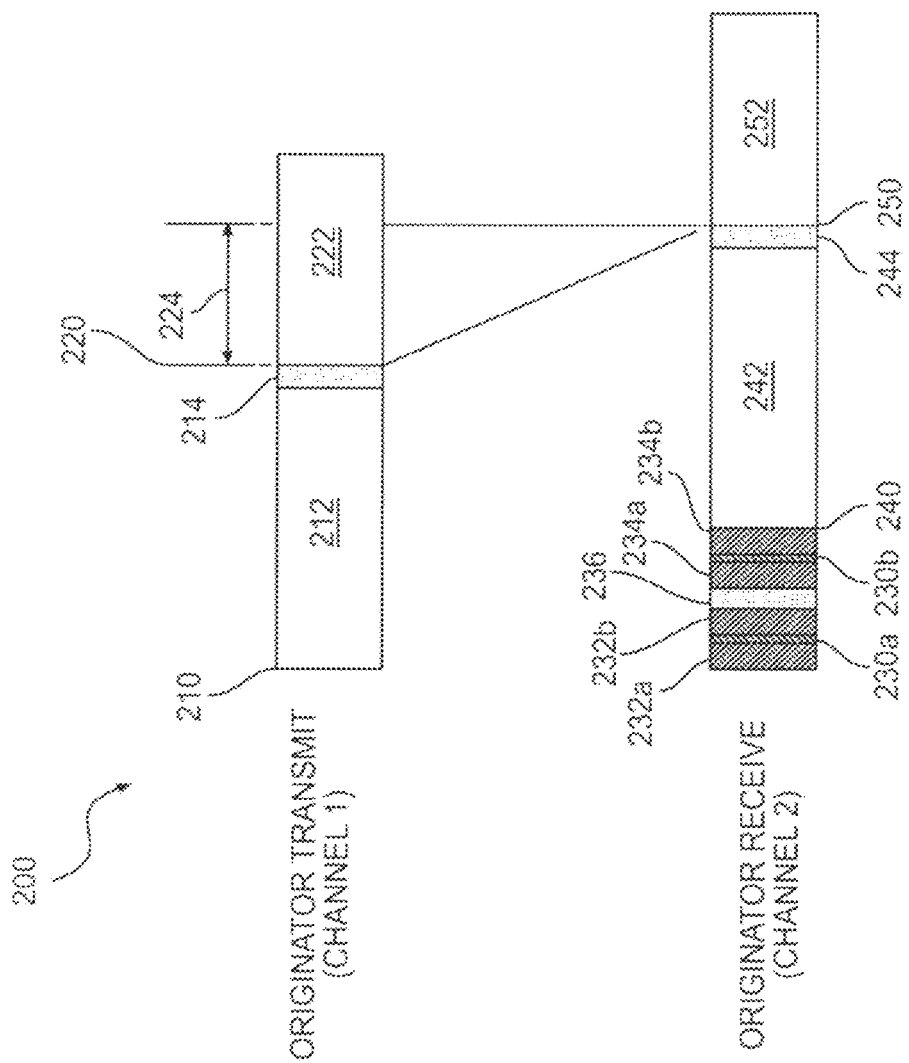
FIG. 2 is an exemplary measurement cycle for a round-trip full-duplex configuration of the exemplary system embodied in FIG. 1.

Referring now to FIG. 2, an exemplary measurement cycle 200 for a round-trip full-duplex configuration is shown. For either the full-duplex or the half-duplex configuration, a radio (the originator) begins each measurement cycle by transmitting a PN-coded message via transceivers or transmitters known in the art. In one embodiment, each PN-coded message may consist of three parts: a preamble of a plurality of PN code sequences, a synchronization word, and a payload of data. The invention is not limited to PN-coded messages in this format, however, and other formats may be used including other methods of synchronization.

As described above, in a round-trip full-duplex configuration, the originator has at least two separate channels: a first channel that transmits a PN-coded message to begin a measurement cycle 200 and a second channel that receives the PN-coded message after being retransmitted by a second radio (the transponder). The transponder also has at least two separate channels: a first channel that receives the PN-coded message from the originator and a second channel that transmits the PN-coded message back to the originator. The transponder may be an analog loopback or "echo" radio as is known in the art. In a round-trip full-duplex configuration, the first channels and second channels in the originator and transponder may contain transceivers or transmitters known in the art capable of transmitting and receiving PN-coded messages and other signals. Such a system typically needs at least two channels in the originator and transponder because PN-coded messages such as those used in the present invention often propagate from the originator to the transponder and back faster than the entire original PN-coded message can be transmitted from the originator. The first channel of the originator is represented by the top column in FIG. 2 while the second channel is represented by the bottom column in FIG. 2.

In a preferred embodiment, the first channel and the second channel of the originator operate at slightly offset master clock frequencies. By offsetting the master clock frequencies of the first and second channel of the originator, the relative phasing between the channels drifts over time at a measurable rate (the drift rate is proportional to the difference in the master clock frequencies). This provides at least three advantages: (1) the signal occupies the entire state space between exactly aligned and misaligned by one half baseband clock cycle, providing a scan across the correlation space, (2) the measured slope of the clock phasing assists in the estimation of the relative phasing when a synchronization word is received, as will be discussed below, and (3) no additional effort is required to ensure synchronization between the respective master clock frequencies.

Each measurement cycle 200 begins when the first channel on the originator begins sending a PN-coded message to the transponder, as shown at 210. As described above, each PN-coded message may consist of three parts: a preamble of a plurality of PN code sequences 212, a synchronization word 214, and a payload of data 222. In a preferred embodiment, the preamble 212 consists of 512 PN code sequences. To create the preamble, the PN code sequence is spread using input data which may be repeating values of "1," or repeating values of "0," or other data, such that the PN code sequence can be used to measure peak error in the manner discussed below. In a preferred embodiment, the synchronization word 214 consists of 8 PN code sequences. Also in a preferred embodiment, each PN code sequence is 17 chips in length. For reasons discussed above, the length of the PN code sequence is inversely proportional to the theoretical ranging accuracy limit. The invention is not limited, however, to PN-code sequences and synchronization words of specific sizes and other lengths may be used consistent with the invention.

After the first channel of the originator sends a PN-coded message, the transponder receives the message, demodulates the RF carrier frequency to intermediate frequency (IF), then modulates from IF to a new RF carrier frequency, and then re-transmits the message to the originator. The second channel on the originator receives and demodulates this message from the transponder and sends the PN-coded message to a correlator in the second channel, which may be a real-time correlator. The propagation time from the originator to the transponder and back are represented by 230a and 230b in FIG. 2 respectively. System delays related to transmitting and receiving are represented by 232a (transmitting from the originator), 232b (receiving by the transponder), 234a (transmitting from the transponder) and 234b (receiving by the originator). These system delays 232 and 234 which will be referred to collectively as $t_{System\_Delay}$, may be calibrated for a particular embodiment and may be either a fixed value or a value determined by the environmental conditions such as temperature. The system delay related to the transponder demodulating the RF carrier frequency to IF and then modulating from IF to a new RF carrier frequency is represented by 236. This delay will be referred to as $t_{Loop\_Back}$.

At 240, the second channel of the originator begins receiving data and tracking the phase offset, if any, between the received data (which is at the first channel master clock frequency, $f_{First}$) and the local (second channel) master clock frequency, $f_{Second}$. Specifically, the correlator in the second channel of the originator outputs the baseband signal and timing information regarding the peaks of the autocorrelation function for use in peak error tracking to calculate a fine time adjustment, as described in further detail below. The preamble 212 sent by the first channel generally corresponds to the preamble 242 received by the second channel.

At 220, the first channel of the originator transmits a synchronization word 214, and begins counting the number of local (first channel) master clock cycles that elapse between 220 and 250, when the second channel receives a synchronization word 244 from the transponder. As described below in further detail, the master clock count, $M_{Count}$, is used to calculate a coarse timing measurement in a manner described in further detail below. The time frame of $M_{Count}$ is represented by 224. Generally, and as described below in further detail, the numbers of master clock cycles counted by the originator is used to calculate a coarse timing measurement while the fine adjustment, described below in further detail, allows correction of time intervals smaller than the master clock cycle of the originator.

A synchronization word detector function determines when the synchronization word has been received or sent. The synchronization word 214 sent by the first channel generally corresponds to the synchronization word 244 received by the second channel. The payload of data 252 received by the second channel generally corresponds to the payload of data 222 sent by the first channel.

Figure 3:
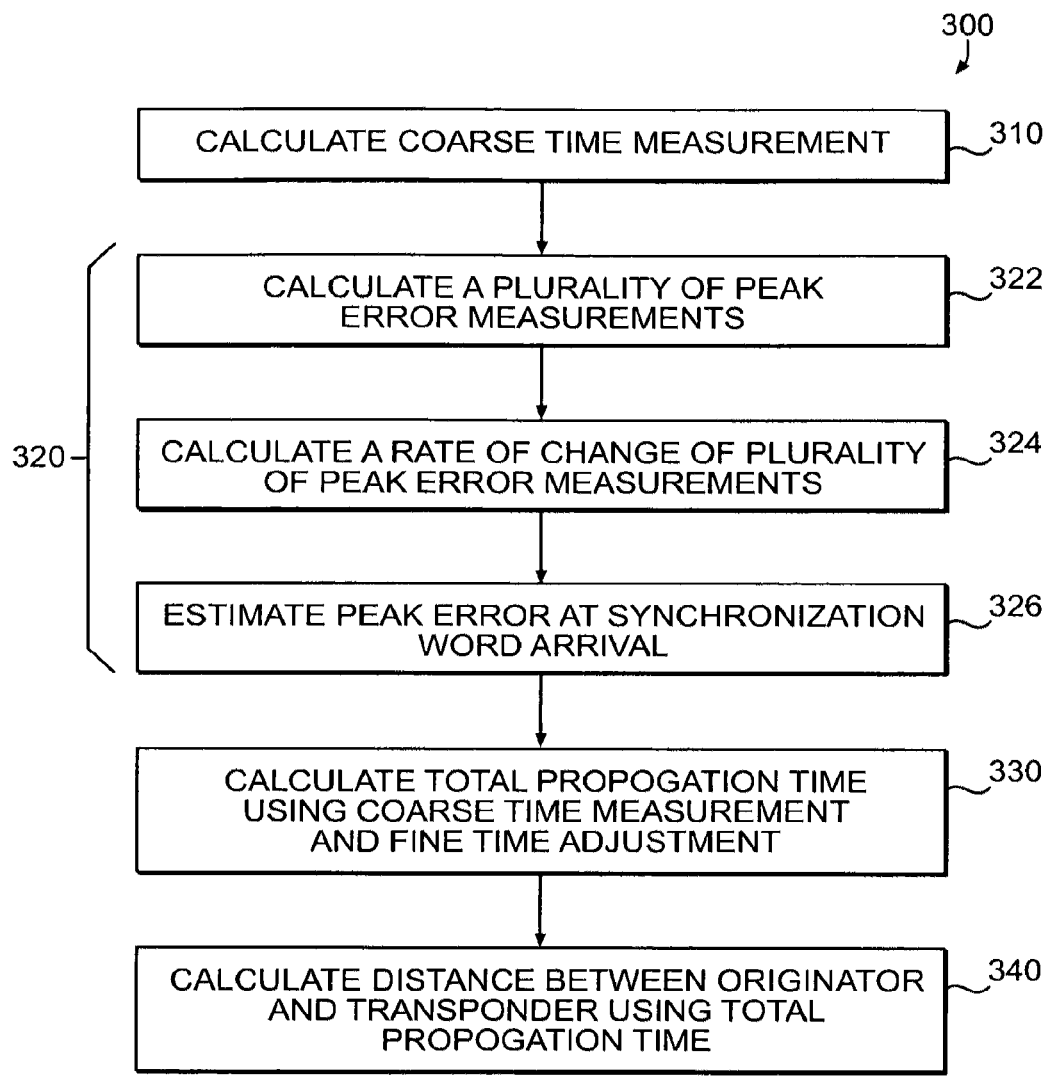
FIG. 3 is an exemplary method of the present disclosure.

Referring to FIG. 3, in accordance with one aspect of the present disclosure, as embodied and broadly described herein, a method for measuring a distance between an originator and a transponder 300 includes a step 310 of calculating a coarse time measurement. Step 310 may be performed using a field programmable gate array (FPGA), an integrated circuit (IC), a digital signal processor (DSP) or microcontroller in the originator. Generally, the coarse time measurement is proportional to the master clock count discussed above ($M_{Count}$), normalized by the frequency of the first channel ($f_{First}$). For the embodiment shown in FIG. 2, the round-trip coarse time measurement, $t_{coarse}$, is given by the equation $$t_{coarse} = \frac{M_{Count}}{f_{First}} \quad (1)$$

As evident from the calculation above, a distance measuring system based solely on $t_{coarse}$ would be limited by the resolution of the cycle time of the master clock in the first channel of the originator. For this reason, the present invention utilizes fine time adjustments to achieve sub-clock cycle time resolution and improved accuracy.

Further in accordance with a first aspect of the present disclosure and in accordance with a third aspect of the present disclosure, as embodied and broadly described herein, process 300 includes a step 320 of calculating a fine time adjustment in an originator. Step 320 may be performed using an FPGA, an IC, a DSP, or a microcontroller in the originator. As described above, the autocorrelation function of a PN code sequence displays a sharp peak when the PN code sequences are aligned. The peak moves with the phase offset between the two PN code sequences. This phase offset between the first channel master clock and the second channel master clock will be referred to as the "peak error." By accurately tracking the peak error during the entire preamble received by the second channel (242 in FIG. 2), the system can provide an accurate rate of change of the peak error measurements during that preamble, and thereby provide an accurate estimate of peak error when the synchronization word arrives in the second channel (250 in FIG. 2). As described in greater detail below, this process improves the ability of an RF ranging system to estimate distance.

Figure 4:
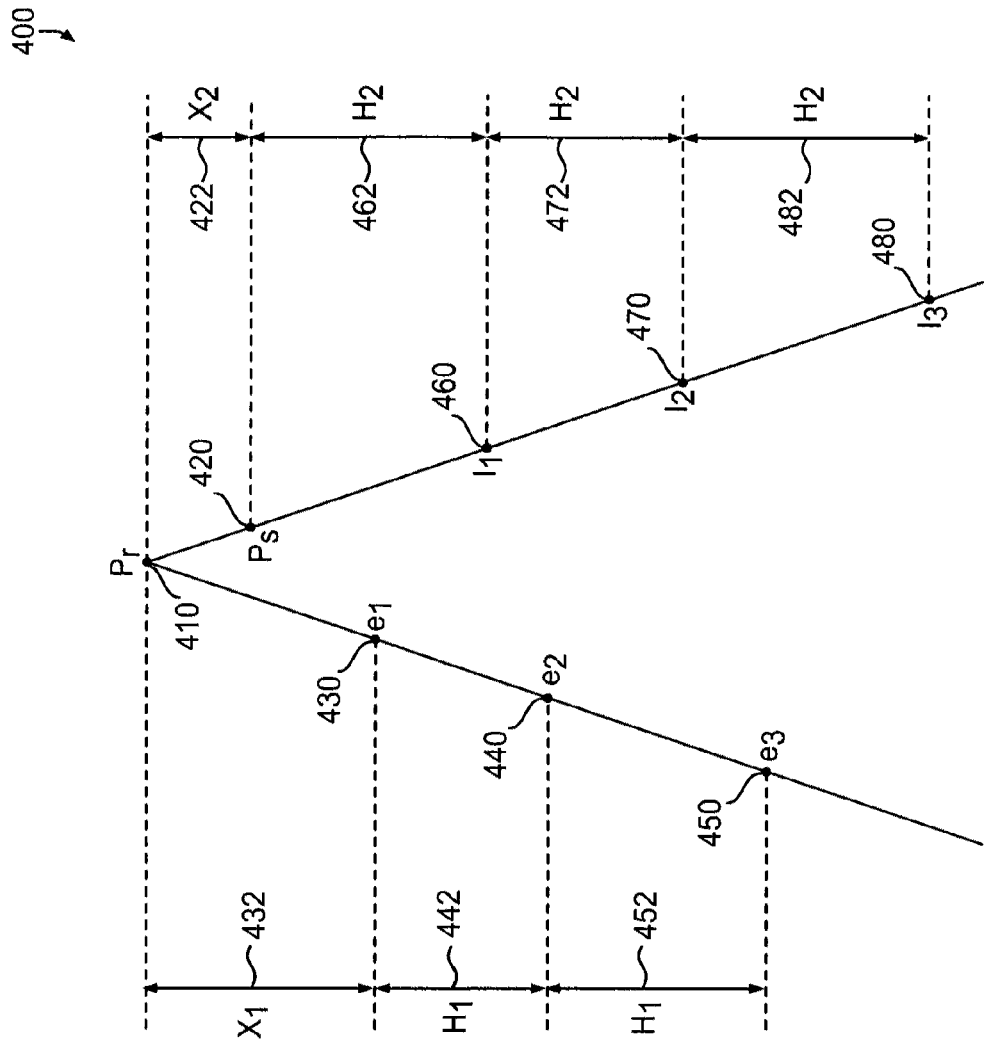
FIG. 4 is an exemplary depiction of an ideal correlator output peak.

In sub-step 322 of step 320, the system calculates a plurality of peak error measurements during the preamble of an exemplary message received by the second channel (242 in FIG. 2). In the present invention, the system oversamples the correlation output to provide sufficient data points to estimate the peak error. In a preferred embodiment, the system oversamples the correlation output at four times the frequency of the PN sequence. Referring to FIG. 4, an exemplary depiction of an ideal correlator output peak is shown. Point 410 depicts the unknown "real peak" ($p_r$) while point 420 defines the closest sampled value, or "sampled peak" ($p_s$). Points 430, 440, 450, 460, 470 and 480 correspond to sampled values, $e_1$, $e_2$, $e_3$, $l_1$, $l_2$, and $l_3$ respectively. The difference between adjacent sampled values is given by $H_1$ and $H_2$ as depicted in FIG. 4 as 442, 452, 462, 472, and 482. Those relationships result in the following equations:

$$H_1 = e_1 - e_2 \quad (2)$$

$$H_2 = l_1 - l_2 \quad (3)$$

$$p_s = l_1 + H_2 = 2l_1 - l_2 \quad (4)$$

The peak error is a measure of how far the sampled peak ($p_s$) is from the unknown "real peak" ($p_r$) in terms of a fractional clock cycle. A positive peak error is defined as the real peak leading the sampled peak. The differences between the unknown "real peak" ($p_r$) and the adjacent samples are given by $X_1$ and $X_2$, as depicted in FIG. 4 as 432 and 422. Thus, the peak error, $E_{peak}$, is given by the equations $$E_{peak} = \frac{X_2}{H_2} = \frac{p_r - p_s}{H_2} \quad (5)$$

$$E_{peak} = 1 - \frac{X_1}{H_1} = 1 - \frac{p_r - e_1}{H_1} \quad (6)$$

Solving these equations simultaneously results in a peak error equation as follows for the ideal correlator output:

$$E_{peak} = \frac{2e_1 - e_s - 2l_1 + l_2}{e_1 - e_s + l_1 - l_2} \quad (7)$$

Figure 5:
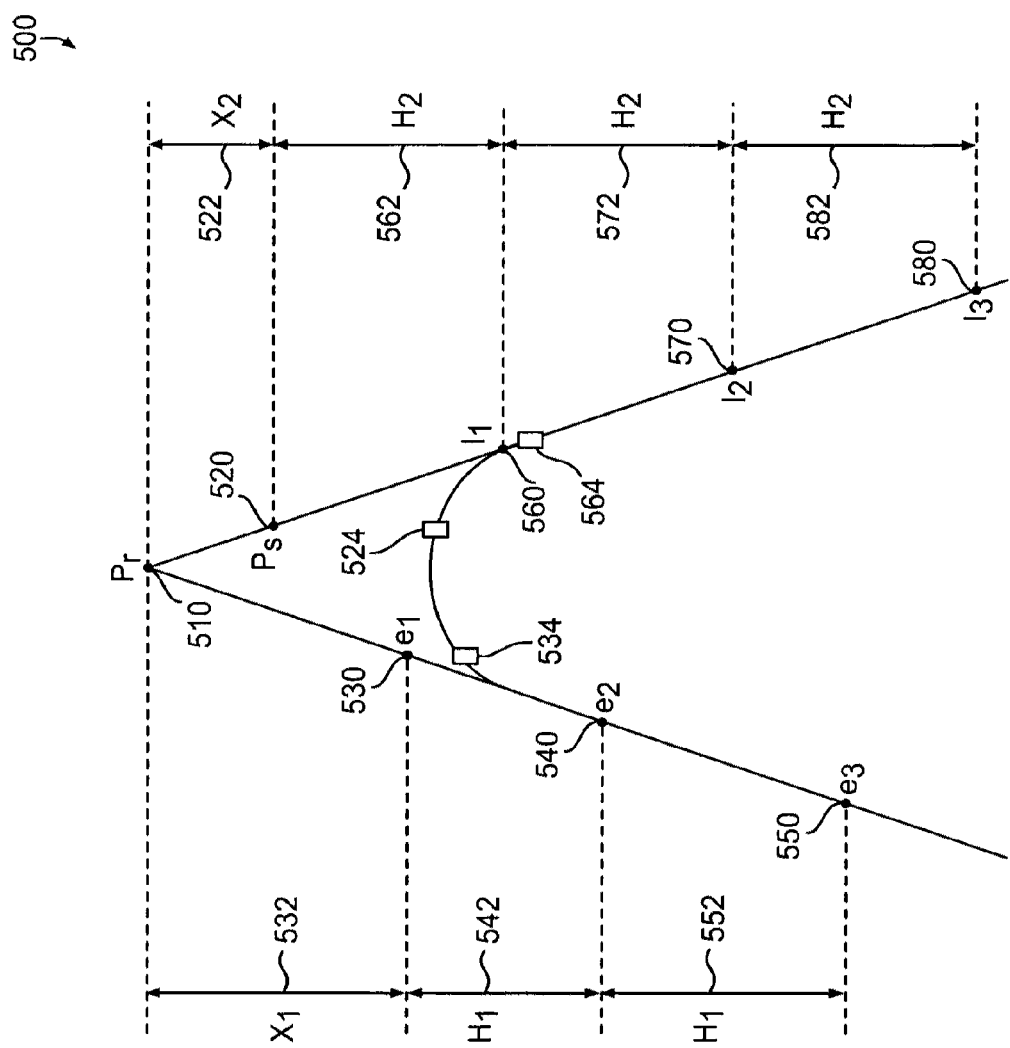
FIG. 5 is an exemplary depiction of a typical, rounded correlator output peak.

Due to finite system bandwidth, the correlator output does not have a sharp peak as depicted in FIG. 4. In a preferred embodiment, a system embodying the present disclosure may utilize approximately 22 MHz RF bandwidth. Referring to FIG. 5, an exemplary depiction of a typical, rounded correlator output peak is shown. Point 510 depicts the unknown "real peak" ($p_r$). Points 540, 550, 570 and 580 correspond to sampled values $e_2$, $e_3$, $l_2$, and $l_3$ respectively. Point 520 represents the "ideal" sampled peak ($p_{si}$) which in the finite bandwidth system is sampled as point 524. Point 530 represents the "ideal" sample of value $e_1$, which in the finite bandwidth system is sampled as point 534. Similarly, point 560 represents the "ideal" sample of value $l_1$, which in the finite bandwidth system is sampled as point 564. Because the values of $p_{si}$, $e_1$, and $l_1$ are unknown in the finite bandwidth case, the system must use samples further away from $p_r$ where the correlator output is more linear, i.e., less rounded.

Thus, the system uses the following equations:

$$H_1 = e_2 - e_3 \quad (8)$$

$$H_2 = l_2 - l_3 \quad (9)$$

$$p_{si} = l_2 + 2H_2 = l_2 + 2(l_2 - l_3) = 3l_2 - 2l_3 \quad (10)$$

As in the ideal system, the peak error is a measure of how far the ideal sampled peak ($p_{si}$) is from the unknown "real peak" ($p_r$) in terms of a fractional clock cycle. A positive peak error is defined as the real peak leading the ideal sampled peak. The differences between the unknown "real peak" ($p_r$) and the adjacent samples are given by $X_1$ and $X_2$, as depicted in FIG. 5 as 532 and 522. Thus, the peak error, $E_{peak}$, is given by the equations $$E_{peak} = \frac{X_2}{H_2} = \frac{p_r - p_{si}}{H_2} \quad (11)$$

$$E_{peak} = 1 - \frac{X_1}{H_1} = 1 - \frac{p_r - e_2 + H_1}{H_1} \quad (12)$$

Solving these equations simultaneously results in a peak error equation as follows for the each ideal correlator output:

$$E_{peak} = \frac{3e_2 - 2e_3 - 3l_2 + 2l_3}{e_2 - e_3 + l_2 - l_3} \quad (13)$$

In a preferred embodiment, this value is scaled by a factor of approximately 1.1 to scale the range of the peak error measurements between −0.5 and 0.5. In the manner described above, in sub-step 322 of step 320, the system calculates a plurality of peak error measurements (i.e. one for each correlator output peak) during the entire preamble of the message received by the second channel (242 in FIG. 2).

In sub-step 324 of step 320, the system calculates a rate of change (i.e. slope) of the plurality of peak error measurements calculated during the entire preamble of the message received by the second channel (242 in FIG. 2). This rate of change is proportional to the frequency offset, if any, between the first and second channels of the originator and is calculated in a manner known in the art.

In sub-step 326 of step 320, the system uses the rate of change calculated in sub-step 324 to estimate a peak error for when the synchronization word arrives (at 250 in FIG. 2). This value will be referred to as $E_{Peak}$. The system calculates the fine time adjustment, $t_{Fine}$, by normalizing $E_{Peak}$ by the first channel master clock frequency, $f_{First}$, according to the following equation:

$$t_{Fine} = \frac{E_{Peak}}{f_{First}} \quad (14)$$

Further in accordance with a first aspect and a third aspect of the present disclosure, as embodied and broadly described herein, process 300 includes a step 330 of calculating a round-trip propagation time using the coarse time measurement and the fine time adjustment as calculated in steps 310 and 320 respectively. Step 330 may be performed using an FPGA, an IC, a DSP, or a microcontroller in the originator. In a preferred embodiment, the system calculates the total round-trip propagation time according to the following equation:

$$t_{Prop} = t_{Coarse} - t_{Fine} - t_{System\_Delay} - t_{Loop\_Back} \quad (16)$$

The values for both $t_{System\_Delay}$ and $t_{Loop\_Back}$ may be calibrated for a particular embodiment and may be fixed values for the relevant calculations.

Further in accordance with a first aspect and a third aspect of the present disclosure, as embodied and broadly described herein, process 300 includes a step 340 of calculating an estimated one-way distance between the originator and transponder using the round-trip propagation time calculated in step 330. Step 340 may be performed using an FPGA, an IC, a DSP, or a microcontroller in the originator. In a preferred embodiment, the system calculates the estimated distance using the following equation:

$$d = \frac{1}{2} c \cdot t_{Prop} \cdot k_{Medium} \quad (17)$$

where d is the estimated one-way distance between the originator and transponder, c is the speed of light, and $k_{Medium}$ is a correction factor for the speed of light through the intervening medium between the originator and transponder.

Further in accordance with a first aspect of the present disclosure and as described above, process 300 may be implemented in a system where the first channel and the second channel of the originator operate at slightly offset master clock frequencies. By offsetting the master clock frequencies of the first and second channel of the originator, the relative phasing between the channels drifts over time at a measurable rate (the drift rate is proportional to the difference in the master clock frequencies) and can be utilized in the manner described above.

Further in accordance with a first aspect of the present disclosure and as described above, process 300 may be implemented in a system where the first channel and the second channel of the originator operate at slightly offset master clock frequencies. To offset the master clock frequencies of the first and second channel of the originator, the system may utilize one clock for the first channel of the originator and a second clock for the second channel of the originator.

Further in accordance with a first aspect of the present disclosure and as described above, to offset the master clock frequencies of the first and second channel of the originator, the system may utilize a clock for the first channel of the originator and a direct digital synthesis device to create a specified offset from the first clock at the output to the second channel of the originator.

Round-Trip Half-Duplex Configuration

Figure 6:
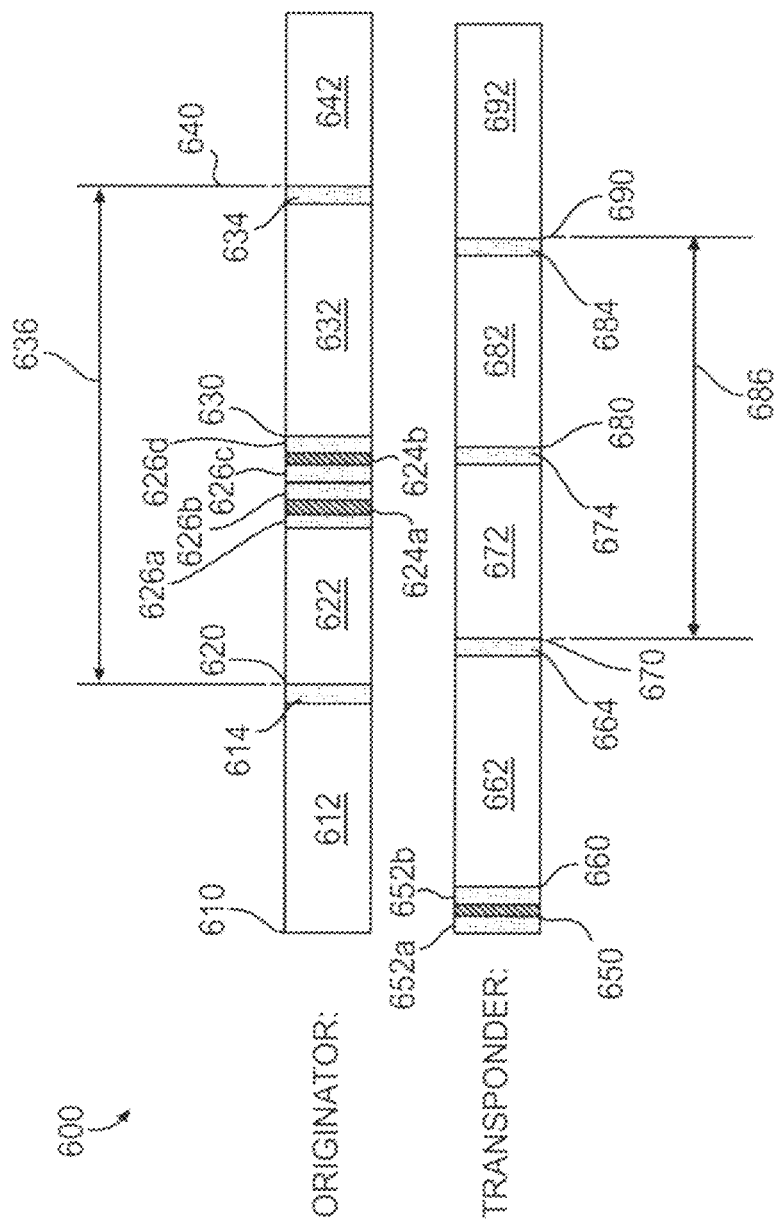
FIG. 6 is an exemplary measurement cycle for a round-trip half-duplex configuration of the exemplary system embodied in FIG. 1.

Referring now to FIG. 6, an exemplary measurement cycle 600 for a round-trip half-duplex configuration is shown. In a round-trip half-duplex configuration, the originator need only have one channel because after the originator transmits a PN-coded message to begin measurement cycle 600, the transponder then receives the PN-coded message and, rather than retransmitting the message as in the round-trip full-duplex configuration, processes the message in a similar manner as did the second channel of the originator in the round-trip full-duplex configuration described above. The originator is represented by the top column in FIG. 6 while the transponder is represented by the bottom column in FIG. 6. In a round-trip half-duplex configuration, the originator and transponder may both contain transceivers or transmitters known in the art capable of transmitting and receiving PN-coded messages and other signals.

In a preferred embodiment, the originator and transponder operate at slightly offset master clock frequencies. By offsetting the master clock frequencies of the originator and transponder, the relative phasing between the radios drifts over time at a measurable rate (the drift rate is proportional to the difference in the master clock frequencies). This provides at least three advantages: (1) the signal occupies the entire state space between exactly aligned and misaligned by one half baseband clock cycle, providing a scan across the correlation space, (2) the measured slope of the clock phasing assists in the estimation of the relative phasing when a synchronization word is received, as will be discussed below, and (3) no additional effort is required to ensure synchronization between the respective master clock frequencies.

Each measurement cycle 600 begins when the originator begins sending a PN-coded message to the transponder, as shown at 610. As described above, each PN-coded message may consist of three parts: a preamble of a plurality of PN code sequences 612, a synchronization word 614, and a payload of data 622. In a preferred embodiment, the preamble 612 consists of 512 PN code sequences. Also in a preferred embodiment, the synchronization word 614 consists of 8 PN code sequences. Also in a preferred embodiment, each PN code sequence is 17 chips in length. For reasons discussed above, the length of the PN code sequence is inversely proportional to the theoretical ranging accuracy limit.

After the originator sends a PN-coded message, the transponder receives the message, demodulates the RF carrier frequency to baseband, and sends the PN-coded message to a correlator, which may be a real-time correlator. The propagation time from the originator to the transponder is represented in FIG. 6 by 650. Internal processing delays are represented by 652a (transmitting from the originator) and 652b (receiving by the transponder).

At 660, the transponder begins receiving data and tracking the phase offset, if any, between the received data (which is at the originator master clock frequency, $f_{Originator}$) and the local (transponder) master clock frequency, $f_{Transponder}$. Specifically, the correlator in the transponder outputs the baseband signal and timing information regarding the peaks of the autocorrelation function for use in peak error tracking to calculate a fine time adjustment, as described in further detail below. The preamble 612 sent by the originator generally corresponds to the preamble 662 received by the transponder.

At 620, the originator transmits a synchronization word 614, and begins counting the number of local (originator) master clock cycles that elapse between 620 and 640, when the originator receives a synchronization word 634 from the transponder. As described below in further detail, the number of master clock cycles is used to calculate a coarse timing measurement. A synchronization word detector function determines when the synchronization word has been received or sent. The synchronization word 634 received by the originator generally corresponds to the synchronization word 684 sent by the transponder.

At 670, the transponder receives a synchronization word 664, and begins counting the number of local (transponder) master clock cycles that elapse between 670 and 690, when the transponder transmits a synchronization word 684 to the originator. As described below in further detail, the number of master clock cycles is used to calculate a coarse timing measurement. A synchronization word detector function determines when the synchronization word has been received or sent. The synchronization word 664 received by the transponder generally corresponds to synchronization word 614 sent by the originator.

The payload of data 672 received by the transponder generally corresponds to the payload of data 622 sent by the originator. The propagation time 624a generally corresponds to the propagation time from the originator to the transponder, represented by 650. Similarly, system delays 626a and 626b generally correspond to system delays 652a and 652b discussed above. System delay 674 corresponds to system delay 626c and represents system delays in the transponder prior to transmission. System delays 626 and 674, which will be referred to collectively as $t_{System\_Delay}$, may be calibrated for a particular embodiment and may be either a fixed value or a value determined by the environmental conditions such as temperature.

Generally, and as described below in further detail, the number of master clock cycles counted by the originator and the transponder are used to calculate a coarse timing measurement while the fine adjustments, described below in further detail, allow correction of time intervals smaller than the master clock cycle of the originator and/or the transponder.

At 680, the transponder transmits a PN-coded message to the originator. In a preferred embodiment, the preamble 682 consists of 512 PN code sequences. In a preferred embodiment, the synchronization word 634 consists of 8 PN code sequences. Also in a preferred embodiment, each PN code sequence is 17 chips in length. For reasons discussed above, the length of the PN code sequence is inversely proportional to the theoretical ranging accuracy limit.

The originator demodulates the RF carrier frequency and sends the PN-coded message to a correlator, which may be a real-time correlator. The propagation time from the transponder to the originator is represented by 624b. System delays related to receiving at the originator are represented by 626d.

At 630, the originator begins receiving data and tracking the phase offset, if any, between the received data (which is at $f_{Transponder}$) and the local (originator) master clock frequency, $f_{Originator}$. Specifically, the correlator in the originator outputs the baseband signal and timing information regarding the peaks of the autocorrelation function for use in peak error tracking to calculate a fine time adjustment, as described in further detail below. The preamble 682 sent by the transponder generally corresponds to the preamble 632 received by the originator.

At 690, the transponder sends a synchronization word 684, and ceases counting the number of local (transponder) master clock cycles that have elapsed between 670 and 690, as described above. This master clock count, $M_{Count\_Transponder}$, is transmitted to the originator in payload of data 692 for use in a manner described in further detail below. The time frame of $M_{Count\_Transponder}$ is represented by 686.

At 640, the originator receives a synchronization word 634, and ceases counting the number of local (originator) master clock cycles that have elapsed between 620 and 640, as described above. This master clock count, $M_{Count\_Originator}$ used in a manner described in further detail below. The time frame of $M_{Count\_Originator}$ is represented by 636. The synchronization word 634 received by the originator generally corresponds to the synchronization word 684 sent by the transponder.

The payload of data 642 received by the originator generally corresponds to the payload of data 692 sent by the transponder.

Figure 7:
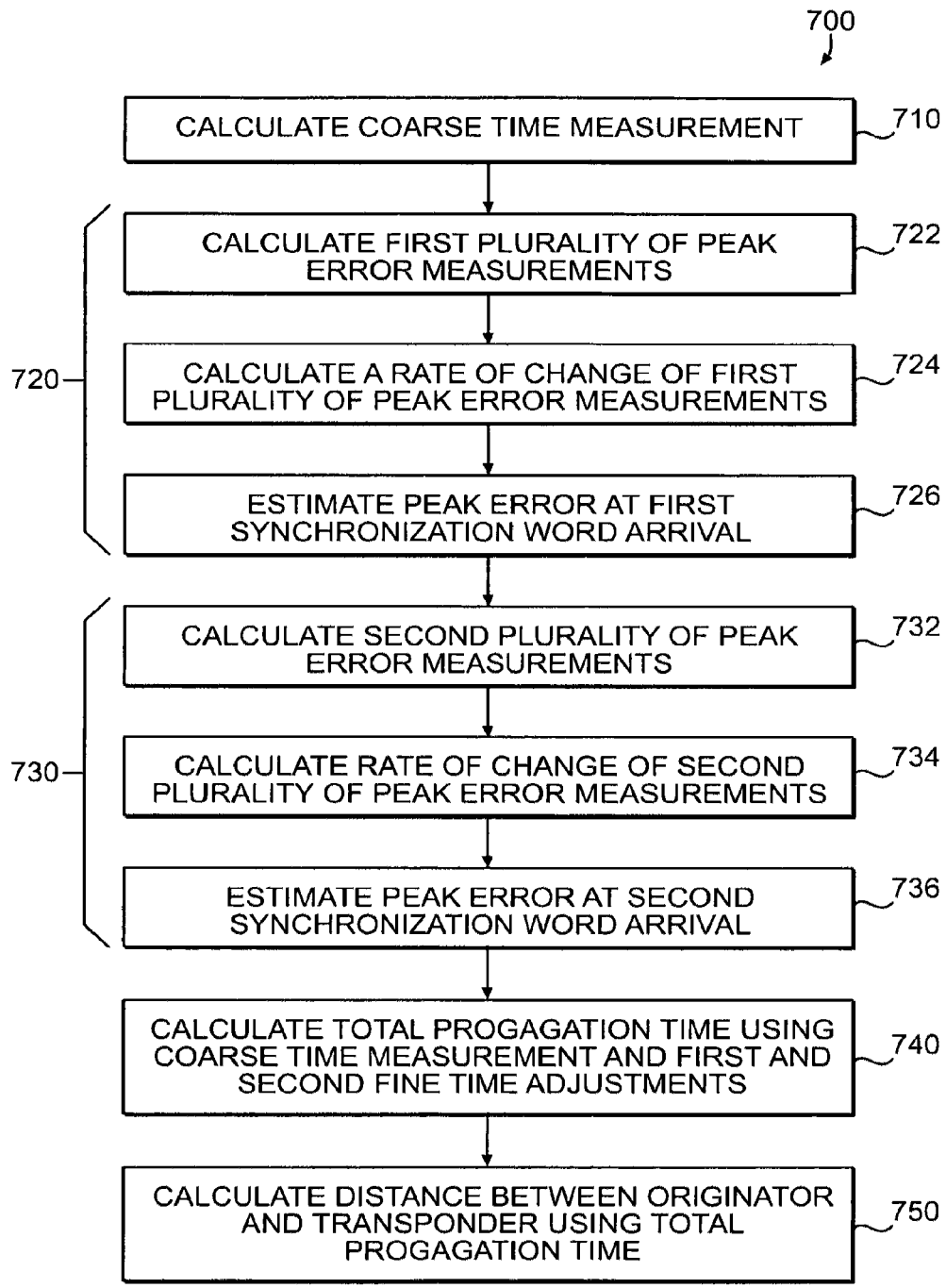
FIG. 7 is an exemplary method of the present disclosure.

Referring to FIG. 7, in accordance with a second aspect of the present disclosure, as embodied and broadly described herein, a method for estimating a distance between an originator and a transponder 700 includes a step 710 of calculating a coarse time measurement. Step 710 may be performed using an FPGA, an IC, a DSP, or a microcontroller in the originator. Generally, the coarse time measurement is proportional to the difference between the clock cycle counts in the originator and the transponder ($M_{Count\_Originator}$ and $M_{Count\_Tranponder}$), each normalized by their respective clock frequencies ($f_{Originator}$ and $f_{Transponder}$). For the embodiment shown in FIG. 6, the round-trip coarse time measurement, $t_{coarse}$, is given by the equation $$t_{coarse} = \frac{M_{Count\_Originator}}{f_{Originator}} - \frac{M_{Count\_Transponder}}{f_{Transponder}} \qquad (18)$$

As evident from the calculation above, a distance measuring system based solely on $t_{coarse}$ would be limited by the resolution of the cycle time of the master clocks in the originator and the transponder. For this reason, the present invention utilizes fine time adjustments to achieve sub-clock cycle time resolution and improved accuracy.

Further in accordance with a second aspect of the present disclosure and in accordance with a third aspect of the present disclosure, as embodied and broadly described herein, process 700 includes a step 720 of calculating a first fine time adjustment in a transponder. Step 720 may be performed using an FPGA, an IC, a DSP, or a microcontroller in the transponder. As described above, the autocorrelation function of a PN code sequence displays a sharp peak when the PN code sequences are aligned. The peak moves with the phase offset between the two PN code sequences. This phase offset between the originator master clock and the transponder master clock will be referred to as the "peak error." By accurately tracking the peak error during the entire preamble received by the transponder (662 in FIG. 6), the system can provide an accurate rate of change of the peak error measurements during that preamble, and thereby provide an accurate estimate of peak error when the synchronization word arrives (at 670 in FIG. 6). As described in greater detail below, this process improves the ability of an RF ranging system to estimate distance.

In sub-step 722 of step 720, the system calculates a first plurality of peak error measurements during the preamble of an exemplary message received by the transponder (662 in FIG. 6). All relevant aspects of sub-step 722 of step 720 are materially similar or the same as the corresponding aspects of sub-step 322 of step 320.

In sub-step 724 of step 720, the system calculates a rate of change (i.e. slope) of the first plurality of peak error measurements calculated during the entire preamble of an exemplary message received by the transponder (662 in FIG. 6). This rate of change is proportional to the frequency offset, if any, between the originator and the transponder and is calculated in a manner known in the art.

In sub-step 726 of step 720, the system uses the rate of change calculated in sub-step 724 to estimate a peak error for when the synchronization word arrives (at 670 in FIG. 6). This value will be referred to as $E_{Peak\_Sync\_One}$. The system calculates the first fine time adjustment, $t_{Fine\_One}$, by normalizing $E_{Peak\_Sync\_One}$ by the transponder master clock frequency, $f_{Transponder}$ according to the following equation:

$$t_{Fine\_One} = \frac{E_{Peak\_Sync\_One}}{f_{Transponder}} \qquad (19)$$

This first fine time adjustment, $t_{Fine\_One}$, is transmitted to the originator in payload of data 692 for use in a manner described in further detail below.

Further in accordance with a second aspect and a third aspect of the present disclosure, as embodied and broadly described herein, process 700 includes a step 730 of calculating a second fine time adjustment in an originator. Step 730 may be performed using an FPGA, an IC, a DSP, or a microcontroller in the originator. By accurately tracking the peak error during the entire preamble received by the originator (632 in FIG. 6), the system can provide an accurate rate of change of the peak error measurements during that preamble, and thereby provide an accurate estimate of peak error when the synchronization word arrives (at 640 in FIG. 6). As described in greater detail below, this process improves the ability of an RF ranging system to estimate distance.

In sub-step 732 of step 730, the system calculates a second plurality of peak error measurements during the preamble of an exemplary message received by the originator (632 in FIG. 6). All relevant aspects of sub-step 732 of step 730 are materially similar or the same as the corresponding aspects of sub-step 722 of step 720.

In sub-step 734 of step 730, the system calculates a rate of change (i.e. slope) of the second plurality of peak error measurements obtained during the entire preamble of an exemplary message received by the originator (632 in FIG. 6). This rate of change is proportional to the frequency offset, if any, between the originator and the transponder and is calculated in a manner known in the art.

In sub-step 736 of step 730, the system uses the rate of change calculated in sub-step 734 to estimate a peak error for the moment the synchronization word arrives (at 640 in FIG. 6). This value will be referred to as $E_{Peak\_Sync\_Two}$. In a preferred embodiment, the system calculates the second fine time adjustment, $t_{Fine\_Two}$, by normalizing $E_{Peak\_Sync\_Two}$ by the originator master clock frequency, $f_{Originator}$ according to the following equation:

$$t_{Fine\_Two} = \frac{E_{Peak\_Sync\_Two}}{f_{Originator}} \qquad (20)$$

This second fine time adjustment and the master clock count, $M_{Count\_Transponder}$, are both transmitted to the originator in payload of data 692 for use in a manner described in further detail below.

Further in accordance with a second aspect of the present disclosure, as embodied and broadly described herein, process 700 includes a step 740 of calculating a round-trip propagation time using the coarse time measurement and the first and second fine time adjustments as calculated in steps 710, 720 and 730 respectively. Step 740 may be performed using an FPGA, an IC, a DSP, or a microcontroller in the originator. In a preferred embodiment, the system calculates the total round-trip propagation time according to the following equation:

$$t_{Prop} = t_{Coarse} - t_{Fine\_One} - t_{Fine\_Two} - t_{System\_Delay} \qquad (21)$$

The value for $t_{System\_Delay}$ may be calibrated for a particular embodiment and may be either a fixed value or a value determined by the environmental conditions such as temperature.

Further in accordance with a second aspect of the present disclosure, as embodied and broadly described herein, process 700 includes a step 750 of calculating an estimated distance between the originator and the transponder using the round-trip propagation time calculated in step 740. Step 750 may be performed using an FPGA, an IC, a DSP, or a microcontroller in the originator. In a preferred embodiment, the system calculates the estimated distance using the following equation:

$$d = \frac{1}{2} c \cdot t_{Prop} \cdot k_{Medium} \qquad (22)$$

where d is the estimated one-way distance between the originator and transponder, c is the speed of light, and $k_{Medium}$ is a correction factor for the speed of light through the intervening medium between the originator and transponder.

Further in accordance with a second aspect of the present disclosure and as described above, process 700 may be implemented in a system where the originator and the transponder operate at slightly offset master clock frequencies. By offsetting the master clock frequencies of the originator and the transponder, the relative phasing between the radios drifts over time at a measurable rate (the drift rate is proportional to the difference in the master clock frequencies) and can be utilized in the manner described above.

Further in accordance with a fourth, fifth, and sixth aspects of the present disclosure, a computer-readable storage medium may contain instructions to configure a processor to perform the previously-described methods.

Further in accordance with a seventh aspect of the present disclosure, an originator may be used in a full-duplex system to estimate a distance between the originator and a transponder as disclosed above.

Further in accordance with a eighth aspect of the present disclosure, an originator may be used in a half-duplex system to estimate a distance between the originator and a transponder as disclosed above.

Further in accordance with a ninth aspect of the present disclosure, a transponder may be used in a half-duplex system that estimates a distance between an originator and the transponder as disclosed above.

The foregoing description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments of the invention. Additionally, although aspects of the invention are described as being stored in memory, one skilled in the art will appreciate that these aspects can also be stored on other types of computer-readable media, such as secondary storage devices, for example, hard disks, floppy disks, or CD-ROM, in silicon, in an FPGA, in an IC, or various forms of RAM or ROM.

Computer programs based on the written description and methods of this invention are within the skill of an experienced developer. The various programs or program modules can be created using any of the techniques known to one skilled in the art or can be designed in connection with existing software. For example, program sections or program modules can be designed for processing on an FPGA, IC, DSP, or microcontroller.

Moreover, while illustrative embodiments of the invention have been described herein, the scope of the invention includes any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application, which examples are to be construed as non-exclusive. Further, the steps of the disclosed methods may be modified in any manner, including by reordering steps and/or inserting or deleting steps, without departing from the principles of the invention. It is intended, therefore, that the specification and examples be considered as exemplary only, with a true scope and spirit of the invention being indicated by the following claims and their full scope of equivalents.

What is claimed is:

1. A method for estimating a distance between an originator and a transponder, the method comprising:
    transmitting a first message from a first channel in said originator;
    receiving a second message on a second channel in said originator;
    calculating a coarse time measurement of the round-trip propagation time between said originator and said transponder;
    calculating a fine time adjustment in said originator comprising:
        calculating a plurality of peak error measurements of a correlator output in said second channel of said originator during a time period;
        calculating a rate of change of said plurality of peak error measurements during said time period; and
        estimating a peak error at a point after said time period by using said rate of change of said plurality of peak error measurements during said time period;
    calculating a round-trip propagation time using said coarse time measurement and said fine time adjustment; and
    calculating an estimated distance between said originator and said transponder using said round-trip propagation time.

2. The method of claim 1, wherein said point after said time period corresponds with said second channel of said originator receiving a synchronization word.

3. The method of claim 2, wherein said originator includes a first channel functioning at a specified master clock frequency and said originator includes a second channel functioning at a master clock frequency other than said specified master clock frequency.

4. The method of claim 3, wherein a first clock outputs said specified master clock frequency and a second clock outputs said master clock frequency other than said specified master clock frequency.

5. The method of claim 3, wherein a first clock outputs said specified master clock frequency and a direct digital synthesis device outputs said master clock frequency other than said specified master clock frequency.

6. A method for estimating a distance between an originator and a transponder, the method comprising:
    transmitting a first message from said originator to said transponder;
    transmitting a second message from said transponder to said originator;
    calculating a coarse time measurement of the round-trip propagation time between said originator and said transponder;
    calculating a first fine time adjustment in said transponder comprising:
        calculating a first plurality of peak error measurements of a correlator output in said transponder during a first time period;
        calculating a rate of change of said first plurality of peak error measurements during said first time period; and
        estimating a peak error at a point after said first time period by using said rate of change of said first plurality of peak error measurements during said first time period;
    calculating a second fine time adjustment in said originator comprising:
        calculating a second plurality of peak error measurements of a correlator output in said originator during a second time period;
        calculating a rate of change of said second plurality of peak error measurements during said second time period; and
        estimating a peak error at a point after said second time period by using said rate of change of said second plurality of peak error measurements during said second time period;
    calculating a round-trip propagation time using said coarse time measurement and said first and second fine time adjustments; and
    calculating an estimated distance between said originator and said transponder using said round-trip propagation time.

7. The method of claim 6, wherein said point after said first time period corresponds with said transponder receiving a synchronization word and said point after said second time period corresponds with said originator receiving a synchronization word.

8. The method of claim 7, wherein said originator operates at a specified master clock frequency and said transponder operates at a frequency other than said specified master clock frequency.

9. A computer-readable storage medium containing instructions to configure a processor to perform a method for estimating a distance between an originator and a transponder, the method comprising:
- transmitting a first message from a first channel in said originator;
- receiving a second message on a second channel in said originator;
- calculating a coarse time measurement of the round-trip propagation time between said originator and said transponder:
- calculating a fine time adjustment in said originator comprising:
  - calculating a plurality of peak error measurements of a correlator output in said second channel of said originator during a time period;
  - calculating a rate of change of said plurality of peak error measurements during said time period; and
  - estimating a peak error at a point after said first time period by using said rate of change of said plurality of peak error measurements during said time period;
- calculating a round-trip propagation time using said coarse time measurement and said fine time adjustment; and
- calculating an estimated distance between said originator and said transponder using said round-trip propagation time.

10. The method of claim 9, wherein said point after said first time period corresponds with said second channel of said originator receiving a synchronization word.

11. The method of claim 10, wherein said originator includes a first channel functioning at a specified master clock frequency and said originator includes a second channel functioning at a master clock frequency other than said specified master clock frequency.

12. The method of claim 11, wherein a first clock outputs said specified master clock frequency and a second clock outputs said master clock frequency other than said specified master clock frequency.

13. The method of claim 11, wherein a first clock outputs said specified master clock frequency and a direct digital synthesis device outputs said master clock frequency other than said specified master clock frequency.

14. A computer-readable storage medium containing instructions to configure a processor to perform method for estimating a distance between an originator and a transponder, the method comprising:
- transmitting a first message from said originator to said transponder;
- transmitting a second message from said transponder to said originator;
- calculating a coarse time measurement of the round-trip propagation time between said originator and said transponder:
- calculating a first fine time adjustment in said transponder comprising:
  - calculating a first plurality of peak error measurements of a correlator output in said transponder during a first time period;
  - calculating a rate of change of said first plurality of peak error measurements during said first time period; and
  - estimating a peak error at a point after said first time period by using said rate of change of said first plurality of peak error measurements during said first time period;
- calculating a second fine time adjustment in said originator comprising:
  - calculating a second plurality of peak error measurements of a correlator output in said originator during a second time period;
  - calculating a rate of change of said second plurality of peak error measurements during said second time period; and
  - estimating a peak error at a point after said second time period by using said rate of change of said second plurality of peak error measurements during said second time period;
- calculating a round-trip propagation time using said coarse time measurement and said first and second fine time adjustments; and
- calculating an estimated distance between said originator and said transponder using said round-trip propagation time.

15. The method of claim 14, wherein said point after said first time period corresponds with said transponder receiving a synchronization word and said point after said second time period corresponds with said originator receiving a synchronization word.

16. The method of claim 15, wherein said originator operates at a specified master clock frequency and said transponder operates at a frequency other than said specified master clock frequency.

17. A computer-readable storage medium containing instructions to configure a processor to perform a method for calculating a fine time adjustment in a radio, the method comprising:
- calculating a plurality of peak error measurements of a correlator output in said radio during a time period;
- calculating a rate of change of said plurality of peak error measurements during said time period; and
- estimating a peak error at a point after said time period by using said rate of change of said plurality of peak error measurements during said time period.

18. An originator for estimating a distance between said originator and a transponder, said originator comprising:
- transmission means for transmitting a first message from a first channel in said originator;
- receiving means for receiving a second message on a second channel in said originator;
- calculating means for calculating a coarse time measurement of the round-trip propagation time between said originator and said transponder;
- calculating means for calculating a fine time adjustment comprising:
  - calculating means for calculating a plurality of peak error measurements of a correlator output in said second channel during a time period;
  - calculating means for calculating a rate of change of said plurality of peak error measurements during said time period; and
  - estimating means for estimating a peak error at a point after said time period by using said rate of change of said plurality of peak error measurements during said time period;
- calculating means for calculating a round-trip propagation time using said coarse time measurement and said fine time adjustment; and
- calculating means for calculating an estimated distance between said originator and said transponder using said round-trip propagation time.

19. The originator of claim 18, wherein said point after said time period corresponds with said second channel of said originator receiving a synchronization word.

20. The originator of claim 19, wherein said originator includes a first channel functioning at a specified master clock frequency and said originator includes a second channel functioning at a master clock frequency other than said specified master clock frequency.

21. The originator of claim 20, wherein a first clock outputs said specified master clock frequency and a second clock outputs said master clock frequency other than said specified master clock frequency.

22. The originator of claim 20, wherein a first clock outputs said specified master clock frequency and a direct digital synthesis device outputs said master clock frequency other than said specified master clock frequency.

23. An originator for estimating a distance between said originator and a transponder, said originator comprising:
   transmission means for transmitting a first message to said transponder;
   receiving means for receiving a second message from said transponder;
   calculating means for calculating a coarse time measurement of the round-trip propagation time between said originator and said transponder;
   calculating means for calculating a fine time adjustment comprising:
      calculating means for calculating a plurality of peak error measurements of a correlator output in said originator during a time period;
      calculating means for calculating a rate of change of said plurality of peak error measurements during said time period; and
      estimating means for estimating a peak error at a point after said time period by using said rate of change of said plurality of peak error measurements during said time period;
   calculating means for calculating a round-trip propagation time using said coarse time measurement, said fine time adjustment, and at least some data from said second message from said transponder; and
   calculating means for calculating an estimated distance between said originator and said transponder using said round-trip propagation time.

24. The originator of claim 23, wherein said point after said time period corresponds with said originator receiving a synchronization word.

25. A transponder for use in a system for estimating a distance between an originator and said transponder, said transponder comprising:
   receiving means for receiving a first message from said originator;
   calculating means for calculating a fine time adjustment in said transponder comprising:
      calculating means for calculating a plurality of peak error measurements of a correlator output in said transponder during a time period;
      calculating means for calculating a rate of change of said plurality of peak error measurements during said time period; and
      estimating means for estimating a peak error at a point after said time period by using said rate of change of said plurality of peak error measurements during said time period; and
   transmission means for transmitting a second message to said originator.

26. The transponder of claim 25, wherein said point after said time period corresponds with said transponder receiving a synchronization word.

27. The transponder of claim 25, wherein at least two of such transponders operate in a network of transponders.

* * * * *